United States Patent [19]

Helman

[11] Patent Number: 5,476,241
[45] Date of Patent: Dec. 19, 1995

[54] WHEELCHAIR ACCESSORY STAND

[75] Inventor: David L. Helman, 11965 W. Van Buren, Riverdale, Mich. 48877

[73] Assignee: David L. Helman, Riverdale, Mich.

[21] Appl. No.: 151,561

[22] Filed: Nov. 12, 1993

[51] Int. Cl.$^6$ .................................. A47B 83/02
[52] U.S. Cl. ................ 248/286.1; 297/DIG. 4; 297/188.18; 280/304.1
[58] Field of Search .................. 248/225.3, 228, 248/257, 258, 274, 276, 278, 286, 316.6, 229, 285, 298, 309.1, 647; 297/DIG. 4, 19, 188, 194; 280/304.1

[56] References Cited

U.S. PATENT DOCUMENTS

| | | | |
|---|---|---|---|
| 715,147 | 12/1902 | Redington | 248/285 |
| 4,484,780 | 11/1984 | Thompson | 297/433 |
| 4,705,287 | 11/1987 | Cumbie | 280/289 |
| 4,741,504 | 5/1988 | Monroe | 248/286 |
| 4,779,884 | 10/1988 | Minati | 280/289 |
| 4,878,685 | 11/1989 | Bahm | 280/304.1 |
| 5,040,813 | 8/1991 | Cumbie | 280/304.1 |
| 5,118,127 | 6/1992 | Partington | 280/488 |
| 5,127,709 | 7/1992 | Rubinstein et al. | 297/444 |
| 5,246,240 | 9/1993 | Romich et al. | 280/304.1 |
| 5,271,481 | 12/1993 | Rich | 182/3 |

OTHER PUBLICATIONS

Quarterly Magazine entitled, *Products to Assist Disabled Sportsmen,* '93–'94 Judy L. Pachner, Author (Calif.) p. 23.

*Primary Examiner*—Leslie A. Braun
*Assistant Examiner*—Catherine S. Collins
*Attorney, Agent, or Firm*—Marshall & Melhorn

[57] ABSTRACT

An accessory stand for mounting on a wheelchair frame, the stand being particularly suited to receive a rifle, a camera, or other device which must be positioned and aimed at a target. The mounting stand offers a full range of movement when supporting the device being used by the wheelchair operator. The mounting assembly is removably mounted to the frame of the wheelchair and is disassembled into a compact unit for storing and transporting. The accessory stand provides a mounting bracket for mounting an adjustable vertical pole in front of the wheelchair in proximity to the wheelchair operator. A horizontal arm is connected to the top of the vertical pole and the height of the pole and the direction of the horizontal arm are adjustable. A slidable base is mounted on the horizontal arm and can be positioned at any position on the arm. The top of the slidable base is provided with a swivel-pivot mechanism connected to a pair of brackets. The brackets are adjustable to securely mount the rifle, camera, or other device. The swivel-pivot mechanism allows the wheelchair operator to easily aim the device by rotating the device in a horizontal direction or moving the device in a vertical direction.

14 Claims, 3 Drawing Sheets

WHEELCHAIR ACCESSORY STAND

BACKGROUND OF THE INVENTION

1. Field of the Invention

The present invention relates to an accessory stand for mounting on a wheelchair frame. The accessory stand is particularly suited to receive a rifle, a camera, or other device which must be positioned and aimed at a target. The mounting stand offers a full range of movement when supporting the device being used by the wheelchair operator. The mounting assembly is removably mounted to the frame of the wheelchair and is disassembled into a compact unit for storing and transporting.

2. Summary of Related Art

Wheelchairs have been improved in recent years to provide wheelchair operators with significant advances in mobility, comfort, and functional capabilities. Numerous wheelchair modifications and accessories have been developed which assist the wheelchair operator in day-to-day living. The latest wheelchairs include computer controlled power drives and seat adjustment features. Accessories which mount on a wheelchair have been designed to assist the operator in performing every day tasks while seated in the chair.

Many of the wheelchair accessories disclosed in the prior art are for trays, tables, and other holders which the wheelchair operator may use for eating or working while sitting in the wheelchair. U.S. Pat. No. 4,878,685 to Bahm discloses a wheelchair work tray which is mounted to the side frame of the wheelchair and includes adjustments for raising and lowering the tray and for rotating the tray about the vertical axis.

U.S. Pat. No. 5,040,813 to Cumbie discloses an accessory holder and mount for a wheelchair. This accessory holder is for a wheelchair having no armrests and mounts on the lower side supports of the wheelchair.

Additional wheelchair support mechanisms for mounting portable trays or tables are disclosed in U.S. Pat. No. 4,705,287 to Cumbie and U.S. Pat. No. 4,779,884 to Minate.

Prior art trays and support stands are mounted for use by the wheelchair operator between the waist and chest of the operator in proximity to the hands of the operator. Although these trays and tables are typically adjustable, they do not have the range of movement or the flexibility for immediate adjustment by the wheelchair operator.

Wheelchair operators often find it difficult to pursue hobbies such as hunting, photography, and home videos. The devices must be aimed by the operator through a site mechanism. After the initial alignment of the device, the operator must move the device to maintain the desired target in proper site.. The wheelchair operator has to be able to support the device and aim the device in a simple and convenient manner in order to successfully pursue such hobbies as hunting and photography.

There is a need for a support stand which will be strong enough to support objects such as a rifle, video camera, telescope or other viewing mechanisms, and which is adjustable to permit the wheelchair operator to aim and focus the rifle, camera or telescope in a timely manner. The prior art accessories may have adjustable positioning mechanisms, but cannot support a rifle or a camera in the line of sight of the wheelchair operator. Other wheelchair accessories may be able to support a rifle or a camera, but do not have the adjustment capabilities needed to aim the device.

SUMMARY OF THE INVENTION

The accessory stand of the present invention provides a mounting bracket for mounting an adjustable vertical pole in front of the wheelchair in proximity to the wheelchair operator. A horizontal arm is connected to the top of the vertical pole and the height of the pole and the direction of the horizontal arm are adjustable to be secured in the desired position for the convenience of the wheelchair operator.

The height and direction of the stand are initially selected when mounting the stand on the wheelchair. Such adjustments are made by affixing a collar on the vertical pole and rotating the vertical pole in the bushings of the mounting frame.

A slidable base is mounted on the horizontal arm and can be secured at any position on the arm. The top of the slidable base is provided with a swivel-pivot mechanism connected to a pair of brackets. The brackets are adjustable to securely mount the rifle or camera. The swivel-pivot mechanism allows the wheelchair operator to easily aim the device by rotating the device in a horizontal direction or moving the device in a vertical direction.

A problem often encountered by wheelchair operators is that they do not have sufficient strength to support the device or to move the device when aiming at a specific target. Not only do wheelchair operators need a stand to support the device, the operators also desire a stand that permits the operator to quickly and conveniently adjust the aim of the device. Such features are essential when hunting wild game or when making a video of a scene which requires frequent camera movement.

Thus, an object of the present invention is to provide a support stand which is easy to secure to the wheelchair. The frame of the stand must be strong enough to support the stand and devices mounted on the stand, but small and light enough to be carried and transported by an individual.

Another object of the present invention is to provide a stand which can support and move a rifle, a camera, a telescope, or other device which is aimed by the wheelchair operator.

A further object of the present invention is to provide the wheelchair operator with adequate adjustment features for the stand. The vertical pole and horizontal arm may be positioned to accommodate the occupant and aim the device in the general direction of the target being viewed. In addition to the frame adjustments, the brackets for securing the device are easily adjusted by a simple push or pull on the device. A wheelchair operator should be able to aim the device in a timely manner.

Another object of the present invention is to provide an economical and convenient stand for cost-effective manufacturing. The parts should be simple to machine and to weld together to reduce manufacturing costs.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
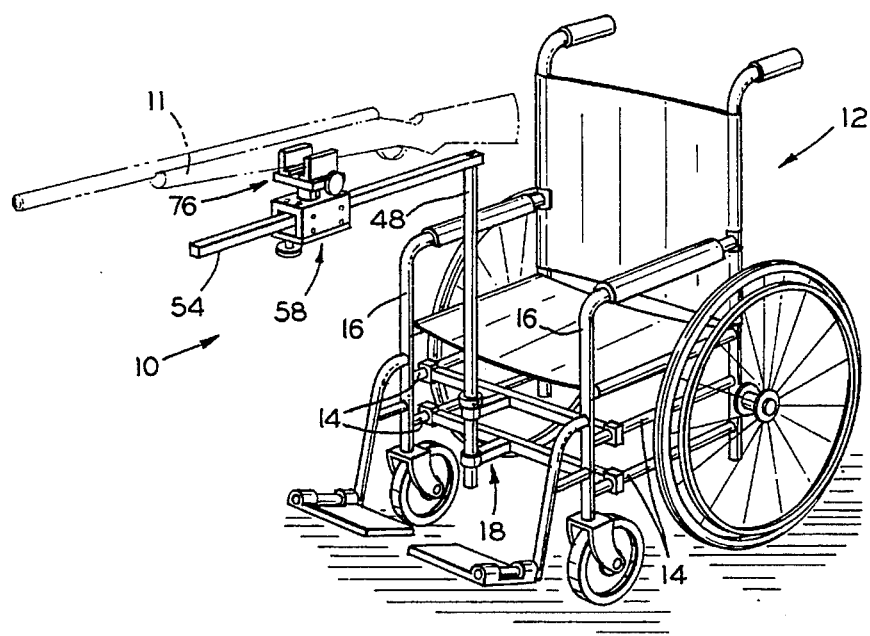
FIG. 1 is a perspective view of the accessory stand mounted on a wheelchair and adapted for receiving a rifle.

Referring now to the drawings, FIG. 1 shows the accessory stand 10 of the present invention positioning the rifle 11 when mounted on wheelchair 12. The rifle 11 is fully supported by the stand 10 of the present invention and is in position for use by the wheelchair operator.

Figure 2:
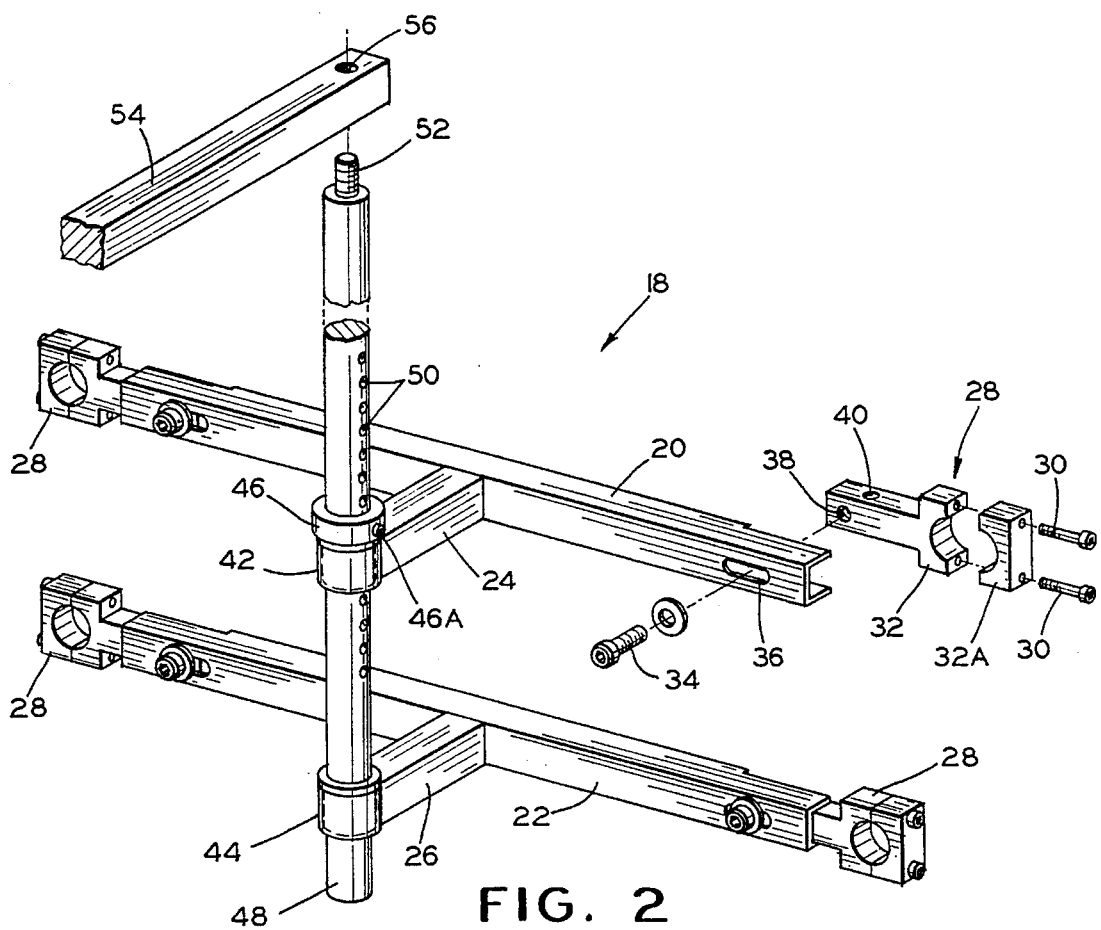
FIG. 2 is a perspective view showing the mounting frame with an exploded mounting bracket for securing the stand to the wheelchair.

The wheelchair 12 typically is provided with side bars 14 or front posts 16 which can be used to secure the stand 10. As shown in FIG. 2, the mounting frame 18 for the stand 10 includes cross arms 20 and 22 extending from one side of the frame of the wheelchair 12 to the other side. Using two cross arms provides more stability to the stand, but one arm 20 may be sufficient for supporting lighter weight devices.

The cross arms 20 and 22 have horizontal extensions 24 and 26 extending perpendicularly from the arms 20 and 22, respectively. The cross arms 20, 22 are secured to the frame of the wheelchair 12 by split mounting blocks 28. The mounting blocks 28 include two bolts 30 for securing the top 32A to the base 32 of the blocks 28. The base 32 of the block includes an extended segment having thread bolt holes 38 and 40 for slidably securing the mounting blocks 28 to the cross arms 20, 22. Bolt 34 is inserted through slot 36 into-either bolt hole 38 or bolt hole 40. When the mounting frame is mounted on the side bars 14, bolt hole 38 is used to secure the blocks 28 in the appropriate position. If they mounting frame 18 is to be connected to the wheelchair front post 16, then the mounting blocks 28 are rotated and secured to the cross arms 20, 22 at bolt hole 40.

The horizontal extensions 24, 26 are provided with sleeve bushings 42, 44 for receiving a vertical pole 48. The vertical pole 48 may be hand-rotated in the bushings 42, 44. A collar 46 with set screw 46A is positioned on the pole 48 by tightening set screw 46A in one of the detents 50 in the vertical pole 48. Adjusting the position of the collar 46 determines the height of the pole 48 above the mounting frame 18. The collar 46 rests on the upper surface of the top bushing 42 and the pole 48 remains rotatable in the bushings 42, 44.

At the upper end of the vertical pole 48, a threaded shaft 52 is used to secure the horizontal arm 54. The shaft 52 is threaded into the threaded opening 56 at one end of the horizontal arm 54. The vertical pole 48 and horizontal arm 54 are rotated until the horizontal arm 54 is secured. Once the arm 54 is tight, the vertical pole 48 may be rotated to extend the arm 54 in the desired direction.

Figure 3:
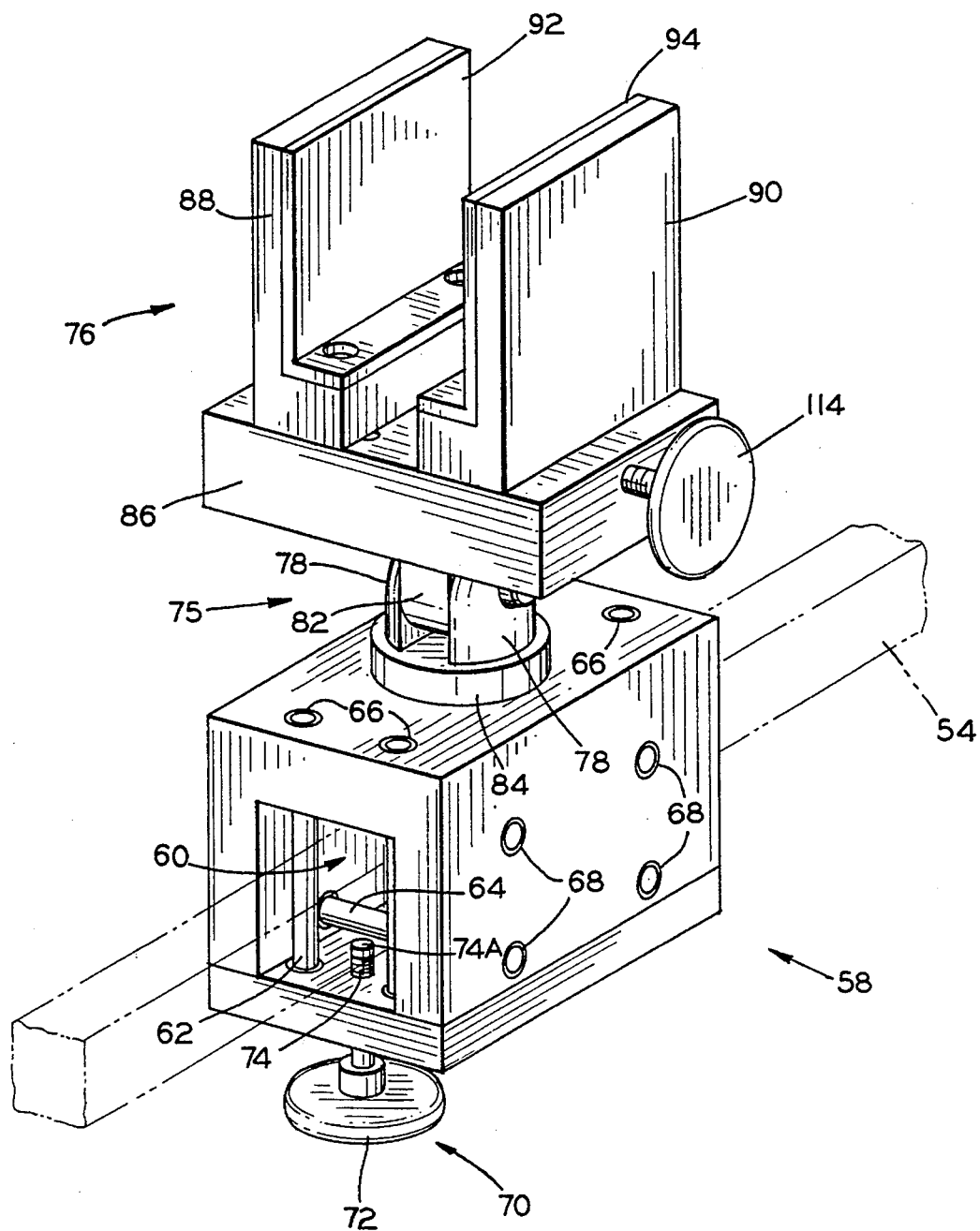
FIG. 3 is a perspective view of the slidable base and support bracket mounted on the horizontal arm.

Referring to FIG. 3, the sliding base 58 is provided with a full-length longitudinal aperture 60 for mounting the base 58 onto the free end of the arm 54. The position of the base 58 is adjusted by merely pushing or pulling the slidable base 58 on the horizontal arm 54. The arm 54 and aperture 60 are generally square in cross section. This eliminates any rotational movement or slippage of the base 58 to provide a steady base for securing the rifle 11 or other device.

In order to facilitate the sliding of the base 58 on the horizontal arm 54, four vertical sleeve bearings 62 and four horizontal sleeve bearings 64 are mounted on vertical shafts 66 and horizontal shafts 68 extending through the base 58. There are two sleeve bearings on each side of the horizontal arm 54 to ensure that the base 58 slides smoothly and easily along the horizontal arm 54. The slidability of the base 58 is important to wheelchair operators who may lack sufficient upper body strength to move the base 58 on bar 54 without such bearings.

Once the base 58 is properly positioned on the arm 54, the locking means 70 is used to temporarily secure the base 58 to the arm 54. The locking means 70 includes a handle 72 and a threaded shaft 74. The thread shaft 74 is provided with a plastic or rubber tip 74A for engaging the horizontal arm 54. The plastic or rubber tip 74A prevents undue wear and damage to the bolt 74 and the arm 54. When the locking means 70 is tightened, the base 58 is secured to the horizontal arm 54.

When the base 58 is slid onto the locking arm 54, the base 58 may be rotated 90° to provide for not only top mounting of the swivel pivot mechanism 75 and the support bracket 76, but also the side mounting of the swivel pivot mechanism 75 and support bracket 76.

Figure 4:
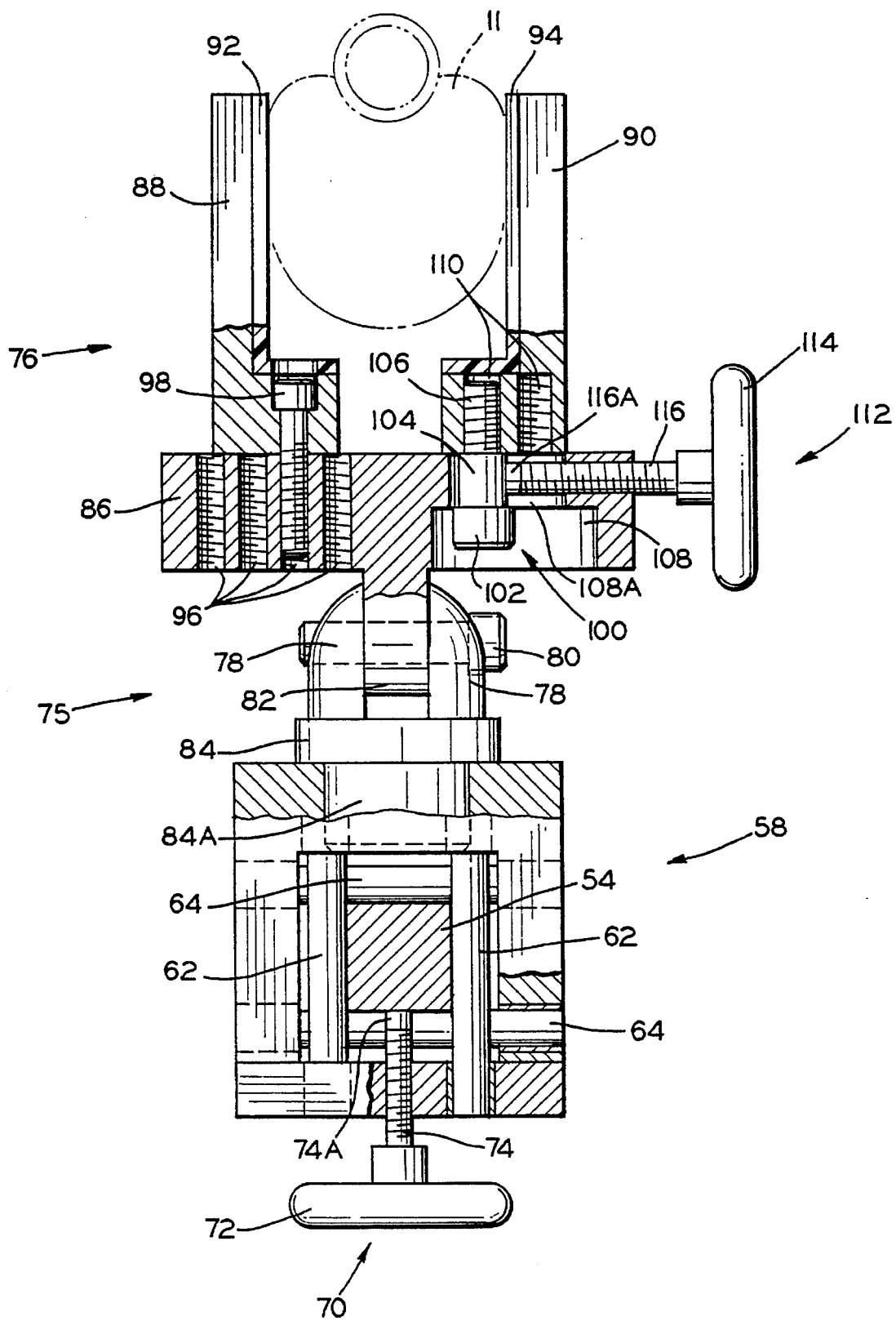
FIG. 4 is a sectional view of the slidable base and support bracket.

Referring to FIG. 4, the swivel pivot mechanism 75 includes a mounting base 84 with extension 84A rotatably secured to the slidable base 58. Two vertical support blocks 78 in a spaced apart relationship extend from the base 84. A locking pin 80 is used to rotatably secure the center flange 82 extending from the foundation 86 of the support bracket 76.

The support bracket 76 may rotate 360° about the rotary base 84 and over 90° in the vertical direction about locking pin 80. The support bracket 76 includes a foundation 86, a fixed bracket 88, and a movable bracket 90. The inner surfaces 92, 94 of the fixed bracket 88 and movable bracket 90 are covered with a padded material. The padded surfaces 92, 94 minimize any damage when clamping the device, such as the rifle 11.

The fixed bracket 88 may be set in one of four positions on the foundation 86. Four threaded positioning holes 96 extend through the foundation 86. A threaded bolt 98 is used to secure the fixed bracket 88 at the desired positioning hole 96.

The adjustable bracket 90 has a different mounting system to secure the bracket 90 to the foundation 86. A shoulder bolt 100 is inserted through a slotted recess 108 in the bottom of the foundation 86 to threadably engage an opening 110 in the bottom of the bracket 90. There are two threaded openings 110 in the bracket 90 and the user can initially select either of the two threaded openings 110 depending upon the width of the device to be secured. The shoulder bolt 100 includes the fastening head 102, the shoulder segment 104, and the threaded shaft 106. In addition to the recess area 108, a narrower slot 108A is provided in the foundation 58 for facilitating the sliding of the shoulder bolt 100 in the slot 108A.

The locking means 112 is used to secure the adjustable bracket 90. The handle 114 is rotated in either direction to move the shaft 116. The shaft 116 is provided with a molded cap 116A to more effectively secure and protect the device. The bracket 90 is opened wide enough to permit the rifle 11 to be inserted between the brackets 88, 90. Once the rifle 11 is in place, then knob 114 is rotated to secure the rifle 11. If the spacing between the brackets 88, 90 is too wide or too narrow, then the positioning bolt 98 and shoulder bolt 100 must be moved to a more appropriate slot to tighten the support brackets 88, 90 about the rifle 11.

For storing and transporting the stand 10 of the present invention, the mounting frame 18, the vertical pole 48, the horizontal arm 54, slidable base 58, and support bracket 76 may be separated into individual pieces.

When ready to install and use the accessory support stand 10, the mounting frame 18 is initially secured to the wheelchair frame 14, 16. The vertical pole 48 is inserted into the sleeve bushings 42, 44, and the collar 46 is tightened in the desired location. The threaded end 52 of the pole 48 is threaded into the hole 56 in the horizontal arm 54. Once the horizontal arm 54 is properly secured to the vertical pole 48, the pole 48 may be turned so that the arm 54 is pointing in the desired direction.

The slidable base 58 is positioned on the arm 54 and secured by locking means 70. The movable bracket 90 is tightened about the rifle 11 or other device being secured. The pole 48 is rotated until the rifle 11 is pointed in the desired direction for use by the wheelchair operator.

Once the stand 10 is set up and the rifle 11 is secured in the desired position, the wheelchair operator may then remain in position to use the rifle 11. To change the aim of the rifle 11, the operator may rotate the rifle 11 about the rotary base 84 of the swivel pivot mechanism 75. The operator may also raise or lower the aim of the gun by pivoting the gun about the mechanism 76.

In addition to the rifle 11 shown in the drawings, a video camera could also be secured by the stand 10. The video camera operator in the wheelchair will be able to rotate the camera 360° to achieve a panoramic view. In addition, the operator would be able to raise and lower the aim of the camera to achieve the desired recording.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wheelchair stand for adjustably mounting a device in proximity to an operator of a wheelchair, said wheelchair stand comprising:
   a) a mounting frame attached to the wheelchair;
   b) a support means having a vertical pole rotatably connected to said mounting frame and a horizontal arm extending from the vertical pole;
   c) a sliding base slidably mounted for fore and aft movement on the horizontal arm of said support means; and
   d) a support bracket pivotally mounted to said sliding base, said support bracket including a pair of adjustable brackets for securing the device, said pair of brackets being removably connected to a foundation connected to said sliding base, said support bracket further including a means for rotating and pivoting the device, whereby the operator of the wheelchair may adjust said support means and said base, and rotate and pivot the device when secured by said brackets, to aim and operate the device.

2. The wheelchair stand defined in claim 1, wherein said mounting frame includes a-cross bar having a split mounting block at each end for securing the cross bar to a frame member of the wheelchair.

3. The wheelchair stand defined in claim 2, wherein said mounting frame includes a pair of independent cross bars connected to the wheelchair in parallel.

4. The wheelchair stand defined in claim 2, wherein the cross bar includes a sleeve bushing extending from the cross bar for rotatably supporting the vertical pole of said support means.

5. The wheelchair stand defined in claim 4, wherein the vertical pole of said support means includes an adjustable collar for engaging the sleeve bushing of said mounting frame whereby the vertical pole is rotatable in the sleeve bushing and the position of the collar on the vertical pole may be adjusted to determine the mounted height of the vertical pole.

6. The wheelchair stand defined in claim 1, wherein the vertical pole includes a threaded shaft at an end of the vertical pole and the horizontal arm includes a corresponding threaded opening at an end of the arm for connecting the vertical pole to the horizontal arm.

7. The wheelchair stand defined in claim 1, wherein said base includes a plurality of sleeve bearings to facilitate the movement of said base on the horizontal arm.

8. The wheelchair stand defined in claim 1, wherein the horizontal arm is generally square in cross section and said base is provided with a generally square aperture to facilitate the mounting of said base on the horizontal arm of said support means.

9. The wheelchair stand defined in claim 8, wherein a plurality of sleeve bearings are arranged in the aperture of said base such that at least one sleeve bearing is supporting the horizontal arm in said base.

10. The wheelchair stand defined in claim 1, wherein said base includes a means for selectively securing said base in any position on the horizontal arm.

11. The wheelchair stand defined in claim 1, wherein said means for rotating and pivoting the device comprises a swivel-pivot joint for securing said pair of adjustable brackets to said base.

12. The wheelchair stand defined in claim 1, wherein said pair of adjustable brackets includes a means for opening and closing the brackets for selectively securing and releasing the device being used by the operator of the wheelchair.

13. The wheelchair stand defined in claim 12, wherein said pair of adjustable brackets include a padded surface for engaging the device.

14. A wheelchair stand for adjustably mounting a device in proximity to an operator of a wheelchair, said wheelchair stand comprising:
   a) a mounting frame provided with a cross bar having a split mounting block at each end for securing the cross bar to a frame member of the wheelchair and a sleeve bushing extending from the cross bar;
   b) a support means having a vertical pole rotatably mounted in the sleeve busing of said mounting frame and a horizontal arm extending from the vertical pole;
   c) a base provided with a full-length longitudinal aperture for slidably mounting said base on the horizontal arm of said support means, said base including a plurality of sleeve bearing in the aperture for engaging the horizontal arm; and
   d) a pair of brackets provided with means for opening and closing the brackets to secure and release the device being used by the operator of the wheelchair, said pair of brackets being connected to said base by a swivel-pivot joint for selectively rotating and pivoting the device, whereby the operator of the wheelchair may adjust said support means and said base, and rotate and pivot the device secured by said brackets, to aim and operate the device.

* * * * *